UNITED STATES PATENT OFFICE.

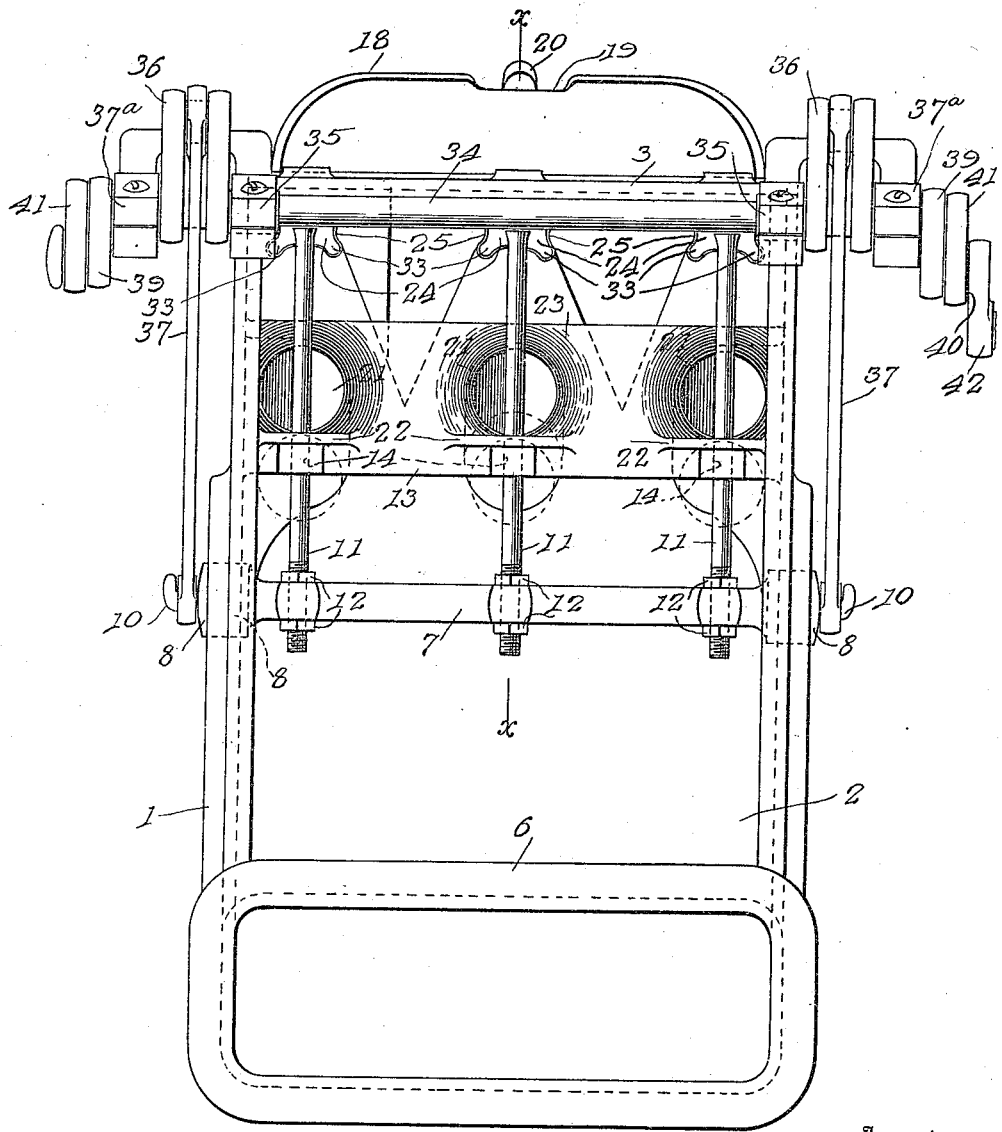

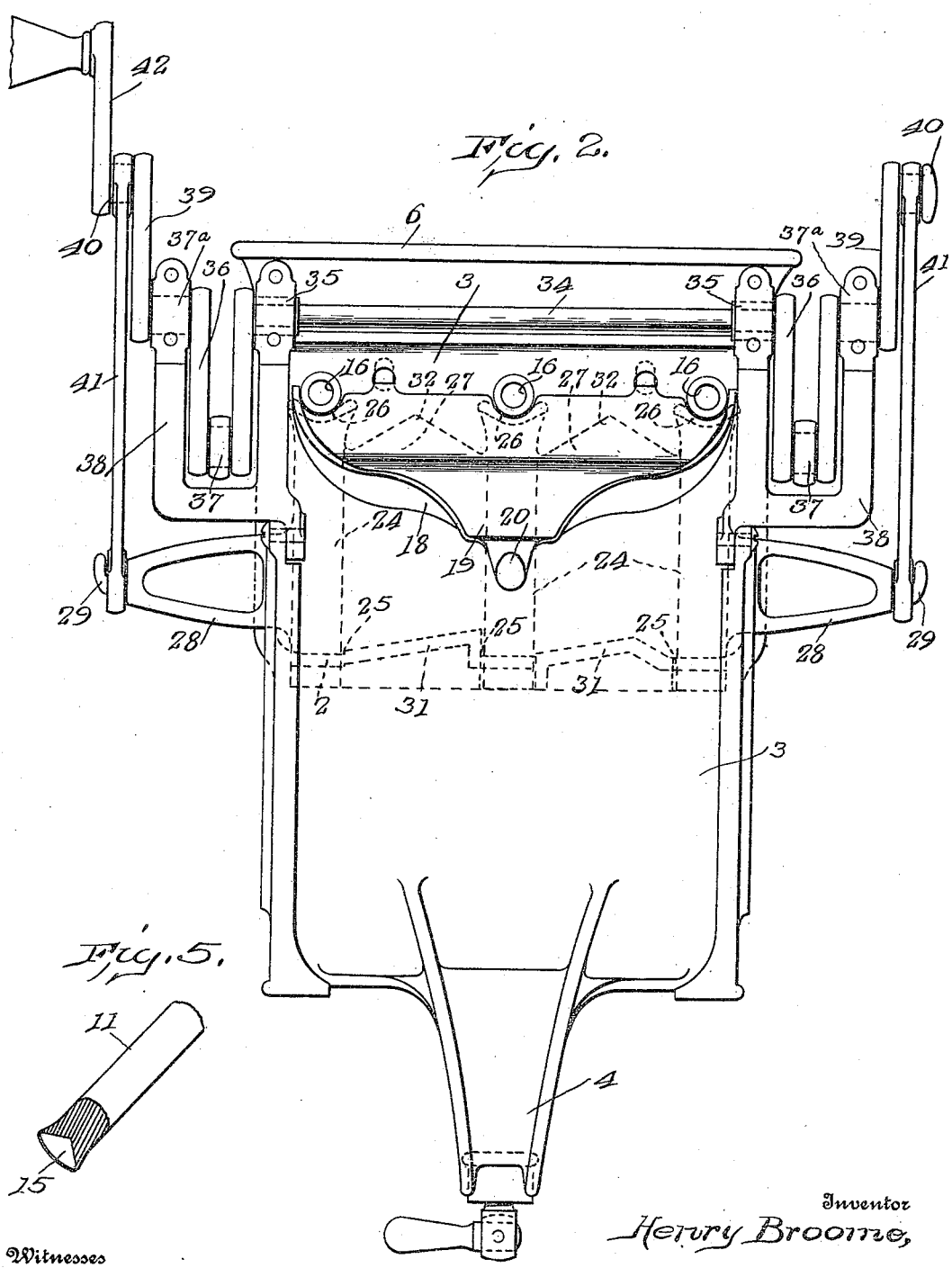

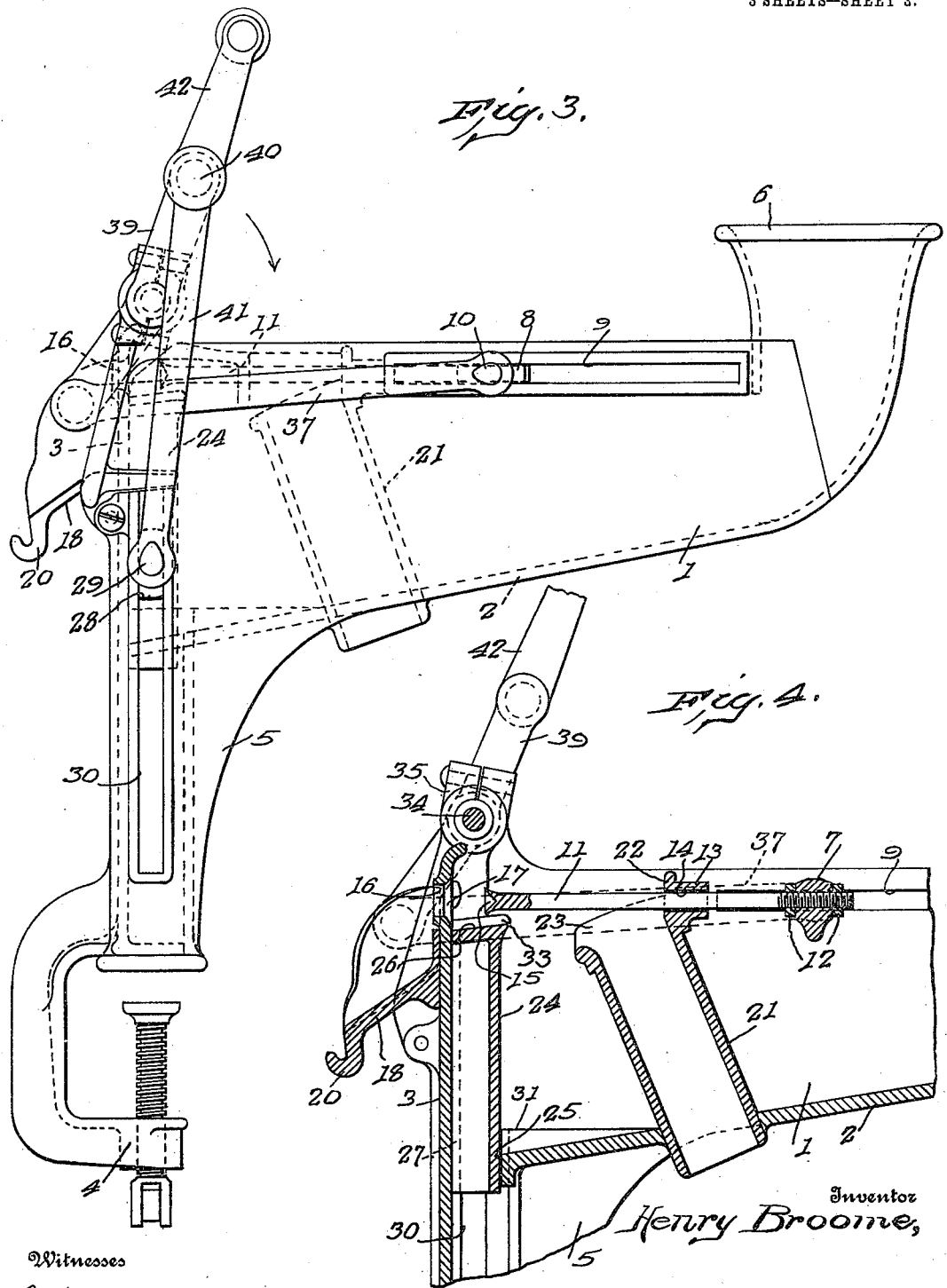
H. BROOME.
CHERRY SEEDER.
APPLICATION FILED JAN. 11, 1909.
961,838.
Patented June 21, 1910.
3 SHEETS—SHEET 3.

HENRY BROOME, OF SPRINGFIELD, OHIO.

CHERRY-SEEDER.

961,838.          Specification of Letters Patent.      Patented June 21, 1910.

Application filed January 11, 1909. Serial No. 471,713.

*To all whom it may concern:*

Be it known that I, HENRY BROOME, a citizen of the United States, residing at Springfield, in the county of Clark and State of Ohio, have invented certain new and useful Improvements in Cherry - Seeders, of which the following is a specification, reference being had therein to the accompanying drawings.

This invention relates to cherry seeders.

The object of the invention is to provide a machine for seeding cherries or other small fruit which will remove the seed or pit from the fruit without crushing or injuring the fruit other than by forming the necessary openings therein to remove the seed; which will operate upon a plurality of cherries simultaneously; to provide such a machine in which the fruit will be fed automatically to the seeding devices; in which the seeds which have been removed will be deposited at one point and the seeded fruit at another; which will be positive in its operation; and which will be simple in its construction and operation and inexpensive to manufacture.

With these objects in view my invention consists in certain novel features and in certain combinations and arrangements of parts hereinafter to be described, and then more particularly pointed out in the claims.

In the accompanying drawings, Figure 1 is a top plan view of a cherry seeder embodying my invention; Fig. 2 is a front elevation of the same; Fig. 3 is a side elevation thereof; Fig. 4 is a longitudinal sectional view, taken on the line $x$ $x$ of Fig. 1; and Fig. 5 is a detail view of one of the seeding plungers.

In the accompanying drawings I have illustrated one embodiment of my invention and have shown the same as comprising a receptacle 1 having its four sides closed and having its bottom 2 sloping downwardly and forwardly, *i. e.*, toward that end of the receptacle where the fruit is operated upon. The front end wall 3 of the receptacle 1 extends slightly above the upper edges of the side walls of the receptacle and extends for a considerable distance below the front edge of the bottom of the receptacle and is provided at its lower end with a suitable clamp 4 for securing the same to a table or other suitable support. The forward portions of the side walls of the receptacle are provided with downwardly extending arms or bracket-shaped projections 5 which are secured to the edges of the front wall 3 of the receptacle and serve to reinforce the same and to impart thereto the necessary strength and rigidity to support the receptacle 1 and the mechanism carried thereby. The receptacle 1 may also, if desired, be provided at its rear end with a hopper 6, by means of which the fruit is fed to the receptacle. In the present instance I have shown the top of the receptacle as open, but, obviously, this could, if desired, be provided with a suitable closure for a part or all of its length.

A suitable seeding device is mounted in the receptacle 1 and preferably consists of one or more rods adapted to have their ends moved through the openings of a perforated plate. In the operation of seeding, the cherry is placed in position near the opening in the plate and is engaged by the rod, which passes through the cherry and forces the seed out of the same and through the opening in the plate.

The foregoing principle could, obviously, be embodied in a variety of mechanisms, but, in the present instance, I have provided a bar or cross head 7 extending transversely to the receptacle 1 and provided at its opposite ends with slide blocks 8 which are preferably formed integral with the cross head and are mounted in guideways or slots 9 arranged longitudinally of the receptacle 1 and preferably near the upper edges of the side walls thereof. The slide blocks 8 are provided on their outer ends with projections or pintles 10 to which may be connected suitable operating mechanism for reciprocating the cross head longitudinally of the receptacle 1. Rigidly secured to the cross head 7 are one or more rods 11 which form seeding plungers, the number of rods or seeding plungers employed being controlled by the size of the machine which is to be built, and, in the present instance, I have provided three of these plungers. These rods have their rear ends screw-threaded and extended through the cross head 7 and are provided on the opposite sides of said cross head with nuts 12, by means of which the rods or seeding plungers are rigidly secured to the cross head and are caused to move in unison therewith. The seeding plungers 11 are spaced suitable distances apart, the distance being determined by the character of the fruit which is to be operated upon. Suitable guideways for the seeding plungers are arranged beyond the forward limit of movement of the cross head. In the present instance I have mounted between the upper edges of the side members of the receptacle 1 a guide member or transverse bar 13 in which are formed suitable guideways or apertures 14, through which the seeding plungers 11 extend and in which said plungers are free to reciprocate. The guide member 13 is arranged, as stated, at a point beyond the forward limit of movement of the cross head 7, and further is so arranged that the seeding plungers will never be entirely withdrawn therefrom, but that, when the cross head is at the rearward limit of its movement, the forward ends of said plungers will be drawn entirely within the guideways 14 and will lie in the rear of the forward ends of said guideways. The forward or operating ends of the seeding plungers are preferably hollowed out or dished, as shown at 15, in such a manner as to provide the same with a cutting edge, thus enabling the same to make a clean smooth cut in the fruit and avoiding the tearing or bruising thereof.

An apertured plate is arranged in front of each of the seeding plungers 11 with its aperture in longitudinal alinement with said plunger. In the present instance I have shown these apertured plates as comprising the front end wall 3 of the receptacle 1 which, as stated, extends slightly above the upper edges of the side walls. This front wall is provided with an opening 16 arranged in alinement with each plunger 11 and of such a size as to permit the free passage of the seed of the cherry or other fruit which is being operated upon, but such that the fruit itself cannot enter the same. The rear or inner surface of the front wall is cut away or countersunk about each of the apertures 16, as shown at 17, to form a seat within which the fruit is seated and which serves to hold the same against movement when engaged by the plunger. The apertured wall is so located relatively to the front ends of the plungers that the front end of each plunger will extend entirely through its aperture and beyond said apertured plate, thus insuring the complete removal of the seed from the fruit.

A chute or trough 18 is supported on the front or outer side of the front wall of the receptacle and is of such a width that it extends beneath each of the three apertures 16 and will receive the seeds which are forced through said apertures. The side walls of this chute converge downwardly and forwardly to form a comparatively narrow outlet 19 at the lower end of the chute. A hook 20 is carried by the chute at its lower end by means of which a suitable receptacle may be supported therefrom to receive the seeds. After the plunger has passed through the fruit and removed the seed therefrom the rearward movement of the plunger will carry the fruit itself, or the meat of the cherry, which is impaled thereon, along with it. A conduit is arranged within the receptacle 1 and suitable means are provided for removing the cherry from the plunger and permitting the same to pass through said conduit. In the present instance I have provided a separate conduit for each plunger and have arranged these conduits at a point between the front wall of the receptacle and the guide member 13 for the plungers. Each conduit comprises a tube 21 extending through the bottom of the receptacle and having a slight downward and rearward inclination, as shown in Fig. 3. The two outermost tubes, 21, are shown as cast integral with the side walls of the receptacle, while the central tube is formed separately from the receptacle and is extended through the bottom thereof. As stated, these conduits are arranged between the front wall of the receptacle and the transverse guide member 13 and beneath the path of movement of their respective plungers. The rear edge of each tube preferably lies immediately beneath the front end of the guideway, formed in the guide member, for the respective plunger, and, consequently, as the cross head approaches the rearward limit of its movement and the front end of the plunger enters the guideway, it will be withdrawn from the cherry which was impaled thereon and the cherry permitted to drop into the tube or conduit which conveys the same to a point beneath the receptacle 1, where a suitable vessel may be provided to receive the same. To facilitate this removal the transverse guide member is preferably formed with flanges 22 extending about the forward ends of the guideways 14 and providing an enlarged surface against which the fruit will bear as the plunger continues its rearward movement. To further insure the entrance of the seeded fruit into the conduits 21 I have formed the transverse guide member 13 with a forwardly extending portion or apron 23 which extends to a point beyond the forward sides of the conduits and is provided with openings registering with the upper ends of said conduits. Those portions of the apron 23 lying between the conduits are raised some distance above the upper edges thereof and slope downwardly toward the conduits, thus forming a hopper-shaped guide which facilitates the entrance of the fruit into the hopper.

It is desirable that means should be provided for automatically placing the cherries, or other fruit, in position to be engaged by the plungers, and, to this end, I have mounted in the forward end of the receptacle 3 feeding plungers 24 which are adapted to lift the cherries from the receptacle and elevate the same to a point in alinement with the seeding plunger and its corresponding opening 16. Each of the plungers 24 is reciprocally mounted in an opening or guideway 25 formed in the forward portion of the bottom of the receptacle and each plunger has its upper end recessed or dished in such a manner as to retain the fruit thereon, as shown at 26. The several feeding plungers are rigidly connected one to the other and are adapted to move in unison, and, in the present instance, the three plungers are rigidly secured to and preferably formed integral with a plate 27. The outermost plunger on each side is provided with an outwardly extending arm 28 from the outer end of which extends a projection or pintle 29 to which suitable operating means may be connected. These outwardly extending arms 28 are reciprocally mounted in guideways 30 formed in the downwardly extending arms or brackets 5 carried by the side members of the receptacle 1. These outwardly extending members, together with the plate 27, on which the plungers 24 are mounted, form in effect a cross head by which the plungers are carried. The downward movement of the plungers is such that when they are in their lowermost position the upper ends thereof will be flush with or slightly beneath the upper surface of the bottom of the receptacle, thus permitting the cherries to pass down the inclined bottom and upon the upper end of the plunger without assistance. The bottom is preferably provided with raised inclined portions or ribs 31 between the guideways 25 to guide the fruit on the upper ends of the plungers. The upper limit of movement of the feeding plungers 24 is such that the upper ends of the same will, when the plunger is in its uppermost position, lie just beneath the respective aperture 16 and will support the cherry or other fruit immediately in front of that aperture and in position to be engaged by the corresponding seeding plunger 11. Those portions of the plate 27 lying between the plungers are preferably pointed, as shown at 32, and serve as agitators to prevent the cherries from becoming wedged in the front portion of the receptacle. To further agitate the fruit and prevent the same from becoming wedged or blocked in the receptacle I have formed the upper end of each plunger 24 with projections extending outwardly from the rear corners thereof, as shown at 33, these projections forming rearwardly extending continuations of the edges of the plungers.

Any suitable mechanism may be employed for actuating the two sets of plungers so long as this mechanism is such that the relative movements of the plungers may be properly timed. In order to properly time these movements and to preserve the same in their proper relations one to the other I prefer to actuate both the feeding plungers and the seeding plungers from the same actuating mechanism, and, for this purpose, I have shown a transverse shaft 34 journaled in bearings 35, formed at the opposite sides of the front portion of the receptacle, and having those portions thereof extending beyond the bearings 35 each provided with a double crank arm 36 to which is secured one end of a pitman 37, the opposite end of which is connected to one end of the cross head 7 by means of the projection or pintle 10. Those portions of the shaft 34 lying beyond the double crank shaft 36 are journaled in bearings 37$^a$ formed in the upper ends of brackets 38 carried by the receptacle. The ends of the shaft extend beyond the bearings 37$^a$, and each has secured thereto a crank arm 39 having a crank pin 40 to which is secured one end of a pitman 41, the opposite end of which is connected to the outer ends of the arms 28, forming a part of the cross head carrying the feeding plungers, by means of the projections or pintles 29. The shaft is preferably actuated by hand, and, to this end, a handle 42 is secured to the crank pin 40 of one of the crank arms 39. The relation of the crank arms 36 and 39 to one another is such that, as the shaft 34 is rotated, the feeding plungers 24 will reach the upper limit of their movement before the seeding plungers 11 reach the forward limit of their movement. As the crank passes its uppermost point there is a brief interval during which the movement of the feeding plungers 24 is very slight, but, owing to the angular relation of the cranks 36 to the cranks 39, the seeding plungers will be moving forwardly at their normal speed and will engage the cherries resting upon the upper ends of the feeding plungers before the feeding plungers have begun their downward movement, or at any rate, before they are moved downwardly a sufficient distance to displace the cherries.

The continued forward movement of the seeding plungers seeds the cherries in the manner above described and discharges the same through the conduits 21, while the feeding plungers are moved to their lowermost position and there receive other cherries and then again move upwardly. It will be noted that in the arrangement of the device herein shown the operating handle and shaft 34 are rotated from right to left, or in a direction contrary to the usual rotation of such members. It will also be noted that, in the drawings, I have shown the feeding plungers at substantially the upper limit of their movement and the seeding plungers as in the position in which they will first engage the cherry supported by the feeding plungers. As the movement of the crank continues, the feeding plungers 24 move downwardly away from the cherry which is retained in position by the seeding plungers 11 which are forced through the same and through the apertures in the front wall of the receptacle.

The operation of the seeder will be readily understood from the foregoing description of the several parts thereof and it will be apparent that the manner of seeding the cherries is such that the fruit will not be bruised, mutilated or injured in any manner other than by the forming therein of the necessary openings to remove the seed or pit; that a plurality of cherries are operated upon simultaneously, the number being determined by the size of the machine; that the cherries are fed automatically into position to be operated upon; that the mechanism is positive in its operation; that provision has been made to prevent the clogging of the feeding mechanism and to insure that each feeding plunger will, on each stroke, place a cherry in position in front of its corresponding seeding plunger. It will further be observed that the seeds which are ejected from the fruit are deposited outside of the receptacle at one point, while the fruit, from which the seeds have been removed, is discharged from the receptacle at another point. Further, it will be apparent that both the feeding and the feeding mechanisms are operated through a common actuating mechanism, thus insuring the preservation of the two parts in their proper relations; also that the machine as a whole is of a comparatively simple construction, comprising a relatively few number of parts and that these parts are such as to be strong and durable and not liable to be broken or disarranged; and further, that the construction of the machine is such as to enable the same to be constructed at a low cost.

While I have described the machine as a cherry seeder and as adapted for seeding small fruits, it will be understood that the machine is capable of a much wider use and that the term "cherry seeder" or "fruit seeder", as used in the specification and claims, is used to describe the character of the machine and is not intended to in any sense limit the use thereof. I, therefore, wish it to be understood that I do not desire to be limited to the exact details of construction shown and described, for obvious modifications will occur to a person skilled in the art.

Having thus fully described my invention, what I claim as new and desire to secure by Letters Patent, is:—

1. A cherry seeder comprising a plunger, a member having an aperture in alinement with said plunger, and a second plunger for moving a cherry into position between said first-mentioned plunger and said apertured member.

2. A cherry seeder comprising a plunger, a member having an aperture in alinement with said plunger, a second plunger for moving a cherry into position between said first-mentioned plunger and said apertured member, and a common means for actuating both of said plungers.

3. A cherry seeder comprising a receptacle adapted to receive a quantity of cherries, a plunger movably mounted in said receptacle, one wall of said receptacle having an aperture arranged in alinement with said plunger, means for moving said plunger toward and away from the aperture in said wall, and positive means for moving a cherry from said receptacle into a position between said plunger and said aperture.

4. A cherry seeder comprising a receptacle, a horizontal reciprocating plunger carried by said receptacle, a guide therefor, an apertured member having its opening arranged in alinement with said reciprocating plunger, means for positively moving a cherry into position between said reciprocating plunger and said opening, and a tubular conduit extending through the bottom of said receptacle and having one end arranged beneath said plunger and in front of said guide.

5. A cherry seeder comprising a receptacle having longitudinal guideways formed in the side walls thereof, a cross head slidably mounted in said guideways, a series of plungers carried by said cross head, and means for actuating said cross head, the front wall of said receptacle having a series of apertures therein arranged in alinement with the respective plungers.

6. A cherry seeder comprising a receptacle having longitudinal guideways formed in the side walls thereof, a cross head slidably mounted in said guideways, means for actuating said cross head, a series of plungers carried by said cross head and adapted to reciprocate therein, a guideway for each of said plungers, the front wall of said receptacle having a series of apertures arranged in alinement with the respective plungers, and a series of conduits arranged beneath the respective plungers and in front of said guide-ways.

7. In a cherry seeder, the combination, with a receptacle having longitudinal guideways formed in the side walls thereof, a cross head slidably mounted in said guideways, and means for actuating said cross head, the front wall of said receptacle having a series of apertures therein arranged in alinement with the respective plungers, of a second series of plungers arranged at an angle to said first-mentioned series of plungers, and means for actuating said second series of plungers to cause each of said second series of plungers to move a cherry into position between one of the first-mentioned series of plungers and its corresponding opening in the front wall of said receptacle.

8. In a cherry seeder, the combination, with a receptacle, a longitudinally slidable cross head mounted therein, and a series of seeding plungers carried by said cross head, the front wall of said receptacle having a series of apertures arranged in alinement with the respective seeding plungers, of a series of vertically reciprocating feeding plungers mounted in said receptacle, and means for actuating said cross head and said feeding plungers.

9. In a cherry seeder, the combination, with a receptacle, a longitudinally slidable cross head mounted therein, and a series of seeding plungers carried by said cross head, the front wall of said receptacle having a series of apertures arranged in alinement with the respective seeding plungers, of a series of vertically reciprocating feeding plungers mounted in said receptacle, and common means for actuating said seeding plungers and said feeding plungers.

10. In a cherry seeder, the combination, with a receptacle and coöperating seeding devices carried by said receptacle and arranged above the bottom thereof, of a feeding device arranged to engage a cherry within said receptacle and move the same into a position to be operated upon by said seeding devices.

11. In a cherry seeder, the combination, with a receptacle, and seeding devices mounted in said receptacle, of feeding plungers mounted in said receptacle and each adapted to support a cherry in position to be operated upon by said seeding devices.

12. In a cherry seeder, the combination, with a receptacle, and seeding devices mounted in said receptacle, of a series of vertically reciprocating feeding plungers mounted in said receptacle, the movement of said feeding plungers being so arranged and of such a length that at the lower limit of their movement the upper end of each of said plungers will lie beneath the upper surface of the bottom of said receptacle, and that, at the upper limit of their movement, the upper end of each of said plungers will lie immediately beneath one of said seeding devices.

13. In a cherry seeder, the combination, with a receptacle, and seeding devices mounted thereon, of reciprocating feeding plungers mounted in said receptacle, means for actuating said feeding plungers, and means carried by said plungers for agitating the cherries in said receptacle.

14. In a cherry seeder, the combination, with a receptacle, and seeding devices mounted thereon, of a series of reciprocating feeding plungers mounted in said receptacle, a plate connecting said plungers one to the other and having those portions lying between said plungers pointed to form an agitator, and means for actuating said plungers.

15. In a cherry seeder, the combination, with a receptacle adapted to contain a quantity of cherries, and a seeding device arranged above the bottom of said receptacle, of a vertically reciprocable feeding plunger mounted in said receptacle, having its upper end concave and adapted to lift a cherry from said receptacle and move the same into position to be engaged by said seeding device, and means for actuating said plunger.

16. In a cherry seeder, the combination, with a receptacle adapted to contain a quantity of cherries, and a seeding device arranged above the bottom of said receptacle, of a vertically reciprocable feeding plunger mounted in said receptacle, adapted to move a cherry into position to be engaged by said seeding device and having projections extending outwardly from the corners thereof to agitate the cherries in said receptacle, and means for actuating said plunger.

17. In a cherry seeder, the combination, with a receptacle adapted to contain a quantity of cherries and having a forwardly and downwardly sloping bottom, and seeding devices carried by said receptacle, of a feeding plunger mounted at the forward end of said receptacle, and means for actuating said feeding plunger to move a cherry into position to be engaged by said seeding devices.

18. In a cherry seeder, the combination, with a receptacle, a series of longitudinally movable seeding plungers mounted in said receptacle, the front wall of said receptacle having a series of apertures arranged in alinement with the respective seeding plungers, of a corresponding series of vertically reciprocating feeding plungers, and a common means for actuating both said seeding plungers and said feeding plungers.

19. In a cherry seeder, the combination, with a receptacle, a series of longitudinally reciprocating seeding plungers mounted in said receptacle, the front wall of said receptacle having a series of apertures arranged in alinement with the respective seeding plungers, and a series of vertically reciprocating feeding plungers mounted in the forward portion of said receptacle, of a shaft journaled on the forward end of said receptacle, means for rotating said shaft, and means actuated by said shaft for actuating both said seeding plungers and said feeding plungers.

20. In a cherry seeder, the combination, with a receptacle having longitudinal guideways formed in the side walls thereof, a cross head slidably mounted in said guideways, a series of seeding plungers carried by said cross head, the front wall of said receptacle having a series of apertures therein arranged in alinement with the respective seeding plungers, and a series of vertically reciprocating feeding plungers mounted in the forward portion of said receptacle and rigidly connected one to the other, of a shaft journaled on the forward portion of said receptacle, means for rotating said shaft, a pair of crank arms on each side of said receptacle, a pitman connecting one of the crank arms of each pair to said cross head, and another pitman connecting the other crank arm of each pair to said vertically reciprocating feeding plungers.

21. In a cherry seeder, the combination, with a receptacle, a cross head slidably mounted thereon, a series of seeding plungers carried by said cross head, and a stationary apertured plate arranged in front of said plungers with the apertures in alinement with the respective plungers, of a series of reciprocating feeding plungers mounted in said receptacle, and means for actuating said cross head and said feeding plungers.

22. In a cherry seeder, the combination, with a receptacle, a cross head slidably mounted thereon, a series of seeding plungers carried by said cross head, one wall of said receptacle having a series of apertures arranged in alinement with the respective seeding plungers, of a series of reciprocating feeding plungers mounted in said receptacle, and means for actuating said cross head and said feeding plungers.

23. In a cherry seeder, the combination, with a receptacle, a cross head slidably mounted thereon, a series of seeding plungers carried by said cross head, one wall of said receptacle having a series of apertures arranged in alinement with the respective seeding plungers, of a series of reciprocating feeding plungers mounted in said receptacle, and a common means for actuating said feeding plungers and said seeding plungers.

24. In a cherry seeder, the combination, with a plunger, and an apertured member having an opening arranged in alinement with said plunger, of a second plunger arranged at an angle to the first-mentioned plunger, and means for actuating said second plunger to cause the same to move a cherry into position between the first-mentioned plunger and said apertured member.

25. In a cherry seeder, the combination, with a receptacle adapted to contain a quantity of cherries, a plunger operatively mounted near the cherries in said receptacle, and an apertured member having an opening arranged in alinement with said plunger, of a second plunger arranged at an angle to the first-mentioned plunger, and means for actuating said second plunger to cause the same to engage a cherry in said receptacle and move the same into position between the first-mentioned plunger and said apertured member.

26. In a cherry seeder, the combination, with a horizontally reciprocating plunger, and an apertured member having an opening arranged in alinement with said plunger, of a vertically reciprocating plunger, and means for actuating said vertically reciprocating plunger to move a cherry into position between said horizontal reciprocating plunger and said apertured member.

27. In a cherry seeder, the combination, with a plurality of reciprocating plungers, means for actuating said plungers in unison, and an apertured member having an opening arranged in alinement with each of said plungers, of a plurality of other plungers reciprocating at an angle to the first-mentioned plungers, and means for actuating said last-mentioned plurality of plungers to cause each of said last-mentioned plungers to engage a cherry and move the same into position between one of the first-mentioned plungers in said apertured member.

In testimony whereof, I affix my signature in presence of two witnesses.

HENRY BROOME.

Witnesses:
A. C. LINK,
EDWARD L. REED.